July 11, 1967 — G. P. MALY — 3,330,350
CONSOLIDATION OF SUBTERRANEAN FORMATIONS
Filed May 21, 1965
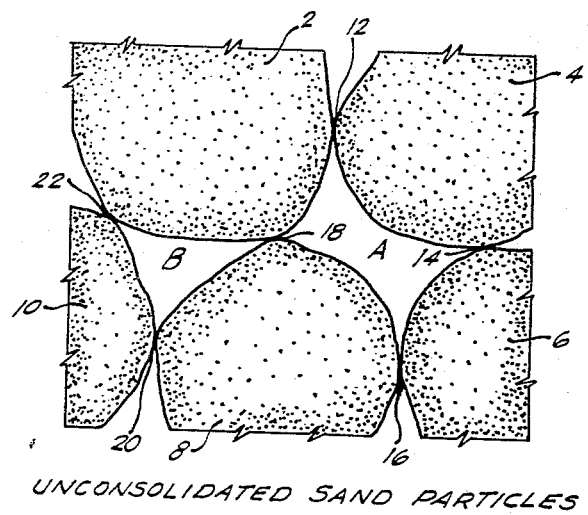
UNCONSOLIDATED SAND PARTICLES
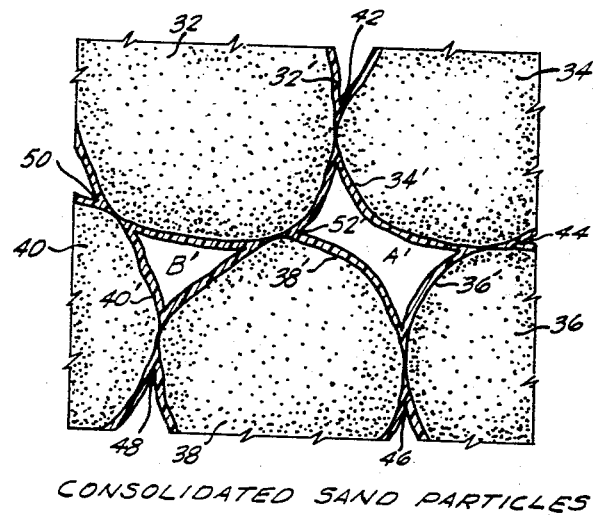
CONSOLIDATED SAND PARTICLES
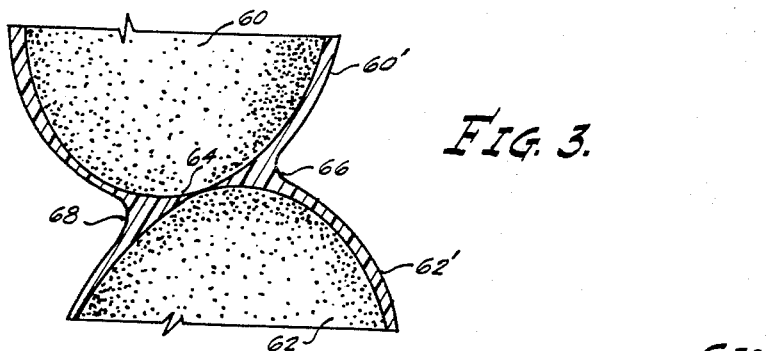
INVENTOR
GEORGE P. MALY
BY
Richard C. Newton
ATTORNEY

United States Patent Office 3,330,350
Patented July 11, 1967

3,330,350
CONSOLIDATION OF SUBTERRANEAN FORMATIONS
George P. Maly, Newport Beach, Calif., assignor to Union Oil Company of California, Los Angeles, Calif., a corporation of California
Filed May 21, 1965, Ser. No. 457,639
19 Claims. (Cl. 166—25)

This invention relates generally to the treatment of incompetent subterranean formations, and more particularly, to an improved method for consolidating subterranean formations by firmly binding the loose particles of the formation together with a hardenable resin in a manner which maintains a substantially high degree of porosity and permeability.

Briefly, stated, the invention entails the deposition of a thin coating of hardenable resin uniformly over the surface of the particles to be consolidated, and subsequent hardening of the deposited resin into a permeable consolidated mass of relatively high compressive strength by treatment with a gaseous curing agent. Uniform deposition of the resinous material over the surface of the partices is achieved by injecting the resin as a solution diluted with a volatile liquid solvent, and then vaporizing the solvent to cause the resin-forming material to be deposited as a coating on the particle surfaces. Increased strength can be achieved by including a complexing agent in the resin capable of effecting full penetration of the curing agent into the resinous coating.

Recoverable fluids, such as petroleum oil, gas and water, are frequently found in subterranean formations comprising unconsolidated, or loosely consolidated sand and sandstone. When such incompetent formations are pierced by a well bore and the conate fluids therein removed, the loose or weakly bound sand particles become dislodged and are entrained in the fluid. Some of the dislodged sand accumulates in the well bore and other flow areas causing plugging and reduced fluid flow, while other of the sand is carried to the surface with the withdrawn fluid. These entrained particles cause severe erosion of underground strainers and liners, the producing string, pressure control valves, pumps and flow lines. Substantial quantities of the entrained sand are deposited in field storage tanks causing cleaning and disposal problems. In extreme cases, sufficient sand can be removed from the producing formation to create large underground voids, or cavities, which can collapse under the overburden pressure causing damage to the well. Thus, fluid production from incompetent subterranean formations can result in restricted flow, and increased production and well maintenance costs, unless the entrainment of sand from the formation can be controlled or completely eliminated.

Various sand control measures, including several consolidation methods, have been employed in an effort to contain incompetent sand within a producing formation. The consolidation of subterranean fluid producing formations with resin binders have been previously proposed. In general, the prior art resin consolidation methods comprise the injection of a resinous liquid monomer or prepolymer, or a solution containing dissolved resin, directly into the formation. The resin is then polymerized, or hardened, by the effect of temperature alone, or a curing agent can be admixed with the liquid resin or resin solution. Alternatively, the curing agent can be separately injected as a second solution following injection of the resin.

Substantial difficulties are encountered in consolidating incompetent fluid producing formations according to the various prior art techniques. For example, excessive quantities of resin are generally required and substantial permeability loss incurred from the injection of an undiluted resin, as the pores paces between sand particles become completely filled with the injected resin. In the case where the resin is injected in diluted form, the resin is deposited onto the particle surfaces by absorption. Complete utilization of the resin is generally not achieved, the unadsorbed resin being usually displaced from the consolidation zone with the solvent. Admixture of the curing agent with the resin prior to injection is also disadvantageous as the polymerization reactions start before injection can be effected, causing deposition of hardened resin in the injection equipment, tubing string, and well bore. Also, the solution viscosity is increased by the polymerization reaction requiring additional pressure to accomplish injection; and the partially polymerized resin does not readily bond to the particle surface. Injection of the curing agent as a second solution following injection of the resin does not necessarily achieve good consolidation, as contact of the curing agent with the resin previously deposited in the formation is difficult, especially where the resin and curing agent solutions have different mobility ratios.

Thus, for the foregoing reasons, substantial permeability loss frequently results as the pore spaces between sand particles are partially, or completely, filled with resin; while the desired strength is generally not achieved because of the inability of the curing agent to fully penetrate the resin coating. In resin consolidation, as with other prior art consolidation techniques, it has not been possible to obtain sufficient adhesion of the resin to the particle surfaces to achieve the desired consolidation without too greatly reducing the porosity and permeability of the formation. Reduced permeability is a serious consequence in a fluid producing formation, inasmuch as expensive techniques are required to restore permeability, which at best are of only limited success.

Accordingly, it is a principal object of the present invention to provide an improved method of consolidating incompetent subterranean formations containing recoverable fluids. A further object is to provide an improved method for consolidating loose subterranean sand formations while retaining a high degree of porosity and permeability in the consolidated formation. A still further object is to provide an improved method of applying a hardened, resinous material to unconsolidated subterranean sand particles contained in a flued producing formation. Other objects and advantages of the invention will be apparent to those skilled in the art from the description which follows.

I have found that the foregoing objects and their attendant advantages can be realized by the deposition of a thin coating of hardened resin relatively uniformly over the surfaces of the sand particles comprising an incompetent formation to be consolidated, and polymerizing the resin into a hard, tenaciously adhering coating by treatment with a gaseous curing agent. The resin-forming material is introduced into the formation as a liquid diluted with a volatile liquid solvent. The solvent is vaporized causing the relatively nonvolatile resin to be deposited substantially uniformly over the exposed surfaces of the sand particles within the treated zone; and the resin-forming material polymerized, or hardened, by contact with the gaseous curing agent. Both the resin and the curing agent are selected to achieve polymerization within reasonable curing times at temperatures existing in the formation. The technique of depositing the resin on the sand by vaporization of the solvent from the resin solution results in the uniform coating of the sand particles with a film of resin, thereby leaving the interstices substantially undiminished in volume. By this technique, a loose, or incompetent, sand structure may be bound into a consolidated formation with compressive strengths frequently exceeding 5000 p.s.i. without substantially diminishing the porosity or permeability of the structure.

The present invention can be more readily understood by reference to the accompanying drawing of which:

FIGURE 1 is an enlarged cross-sectional representation of several loose sand particles in an unconsolidated earth formation.

FIGURE 2 is an enlarged cross-section representation of the sand particles of FIGURE 1 consolidated by the method of my invention.

FIGURE 3 is a further enlarged cross-sectional representation of two adjoining sand particles bound together by a resin film applied according to the method of my invention.

An incompetent formation may wholly comprise a loose, unattached sand particle structure as depicted in FIGURE 1, or masses of sand may be agglomerated within the otherwise loose structure. In either case, when the formation is penetrated by a well bore for removal of connate fluids contained therein, the aforementioned problems of sand entrainment are experienced. In FIGURE 1, adjacent sand particles 2, 4, 6, 8 and 10 are shown in contact at points 12, 14, 16, 18, 20 and 22, thereby defining interstices, or void spaces, A and B. In the usual petroleum producing structure, the individual sand particles are preferentially surface wet by water and the connate oil contained within interstices, such as A and B. Some fields, however, are known to have oil wet formations, with water contained within the interstices. In the typical non-oil-bearing, water-producing formation, the sand particles will be water wet and the interstices will contain water. Of course, interstices A and B can contain gases such as petroleum hydrocarbon gases, nitrogen, carbon dioxide, etc.

The surfaces of the individual sand particles depicted in FIGURE 1 are illustrated as relatively smooth, where in fact sands found in subterranean formations vary in shape, some being rounded spheroids of fairly uniform size and others being of highly irregular shape. The volume of the interstices, such as A and B, per volume of formation is important in the recovery of connate fluids from the formation. Individual fields, and formations within these fields, will naturally vary in porosity; and techniques of production and well treating processes can also affect porosity. Although the individual sand particles in an incompetent formation are in contact with other adjacent sand particles as depicted in FIGURE 1, they are free to move and may be dislodged and entrained from the formation as fluids are withdrawn therefrom.

FIGURE 2 illustrates the same sand particles consolidated by the method of my invention. Depicted therein are sand particles 32, 34, 36, 38 and 40 in contact at points 42, 44, 46, 48, 50 and 52. Again, the adjacent individual sand particles define void spaces A' and B' therebetween. However, whereas the unconsolidated sand particles of FIGURE 1 were in contact, but still free to move, the particles depicted in the consolidated formation of FIGURE 2 are covered by a thin resinous coating illustrated at 32', 34', 36', 38' and 40'. The adhering coatings of the various particles are adjoined at the point of contact of adjacent sand particles to form a cohesive, consolidated, porous sand mass. For example, particles 32 and 34 are covered by resin coating 32' and 34', respectively. These two adjacent particles are in contact within the formation at 42, the coatings there combining to form a single integral structure.

The method of joinder of adjacent particles is illustrated in more detail in FIGURE 3, an enlarged cross-sectional view of two adjoining sand particles 60 and 62, in contact at 64. These two particles are typical of any adjoining particles in the structure of FIGURE 2. Particle 60 is covered by hardened resin coating 60' and particle 62 is covered by a similar coating 62'. Coatings 60' and 62' are combined over an area of the particle surface adjacent contact point 64 to form the fillet of resin depicted in cross-section at 66 and 68. These fillets of resin result from capillary attraction as the particle surfaces are preferentially wet by the resin. The thickness and areal extent of the combined coatings at the contact point is dependent on the geometric configuration of the adjacent sand particles, the viscosity of the resin, the quantity of resin deposited on the sand surface, and the method of application.

In the consolidation technique of my invention, strength is derived from the coating fillets at the contact points of adjoining particles, and also from the resin coating over the peripheral surface of the particles. Because of the difficulty in obtaining good adhesion of the coating to the particle surface, the resin generally has greater strength than the surface bond. This is particularly true in the case of oil and water wet sands. With complete coating of the particle surface, shear forces between adjacent particles are distributed over a larger surface area, rather than being concentrated at the limited area of attachment of the fillet to the sand surface. The strength of the consolidated structure is increased as the bond between the resin coating and the particle surface is improved, a strong bond being obtainable under proper conditions. As will be more fully explained, superior consolidation is effected, both in terms of improved strength and increased permeability, by proper preparation of the surface prior to depositing the resin thereon. The strength of the structure is further increased by proper curing of the resin. Full penetration of the curing agent into the coating and proper hardening of the resin throughout its thickness, particularly at the fillets, increases the strength of the consolidated structure.

Structure strength can be improved by the deposition of increased quantities of epoxy material on the particle surfaces thereby increasing the thickness of the resin coating deposited on the particles. With prior art techniques, substantially thicker coatings were required to attain the desired consolidation. This increased coating thickness results in reduced pore volume, as the interstices, such as A' and B' are partially filled with additional resin, and can be completely so filled resulting in complete plugging of the formation. With the improved technique of the present invention, not only may the thickness of the coating be decreased effecting both a savings in the quantity of resin required, and minimizing the reduction in porosity and loss of permeability, but with the proper application of the resin, strength is further increased, thus permitting even thinner resin coatings.

In treating incompetent subterranean sand formations according to my invention, any convenient method of injecting fluids into the zone to be consolidated can be utilized. The choice of injection techniques will depend primarily on the type and placement of subsurface casings, liners and tubing strings, the type of production equipment, the injection equipment available to the operator, and the experience of the operator. Conventionally, the zone to be treated is isolated by setting mechanical packers in the well bore above and below the consolidation zone. The vertical depth of formation to be consolidated can be controlled by the spacing between such packers. Generally, the zone to be treated can comprise a formation from about 2 to about 50 feet in vertical thickness, although it is preferred to treat a zone having a thickness of not more than 10 feet in a single injection step. Treatment of successive vertical layers of formation may be desirable in the case where a thick zone of incompetent sand is to be consolidated.

Because of the expense and time required to treat an incompetent formation, consolidation of only sufficient sand immediately adjacent the well bore to prevent displacement of the loose sand particles is preferred. Consolidation of the incompetent zone to a lateral distance of from about 1 to about 10 feet from the well bore is usually adequate, although in any particular formation consolidation to a greater horizontal penetration can be advantageous. In most applications, consolidation to a horizontal distance from about 3 to about 6 feet from the well bore is preferred. Although the preferred configuration of the consolidated zone can be defined as a cylinder symmetrically oriented about the well bore, because of differences in permeability, and because of differences in the vertical and horizontal injectivity profile and due to the effect of hydrostatis head, the actual consolidated zone will be somewhat irregular in shape. The assumption that the consolidated zone is a regular cylinder having a height equal to the desired vertical thickness and a radius equal to the desired depth of penetration is sufficiently accurate for computation of required treating agent volumes, etc. The volume of the consolidated zone is the fore or interstitial volume defined by this cylinder.

Any thermosetting resin susceptible of injection into the formation as a dilute liquid solution and capable of being cured by contact with a gaseous curing agent can be employed as the aforementioned resin-forming material. A preferred material is epoxide resin characterized by a molecular structure containing at least one reactive epoxide group:

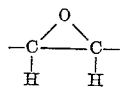

which serves as a polymerization point by cross-linkage with other reactive molecules. Suitable epoxy resins can be grouped into three principal classes: (1) diglycidal ethers of polyhydroxy compounds, such as glycerol, propylene glycol, dihydroxy benzophonone, bis(4-hydroxyphenyl) - 2,2-propane, bis(4-hydroxyphenyl)-2,2-butane, bis(4-hydroxyphenyl)-4,4-pentanoic acid, tetrachlorobisphenol A, etc., obtained by the condensation of epichlorohydrin with one of the aforesaid polyhydroxy compounds, usually bis(4 - hydroxyphenyl)-2,2-propane (Bisphenol A); (2) novolac based epoxies prepared by condensation of epichlorohydrin and polynuclear polyhydroxy phenols; and (3) peracetic epoxides formed by the epoxidation of various unsaturated fatty materials and unsaturated petroleum derivatives. The foregoing epoxy resins can be employed individually, as mixtures with two or more epoxy resins, or in admixture with other resinous materials.

Specially preferred for consolidation of subterranean formations are the peracetic-type epoxides including 3,4-epoxy - 6-methylcyclohexylmethyl-3,4-epoxy-6-methylcyclohexanecarboxylate; dicyclopentadiene dioxide; vinylcyclohexene dioxide; dipentene dioxide (limonene dioxide); allyl-9,10-epoxystearate; 1,2-diisobutylene oxide; 3,4-epoxycyclohexane carbonitrile; 2,3-epoxy-2-ethylhexanol; 3,4-epoxy-6-methylcyclohexylmethyl acetate; ethyl-3,4-epoxy-2,5-endomethylene cyclohexoate; styrene oxide; triisobutylene oxide; and vinylcyclohexene monoxide. Of these specially preferred peracetic-type epoxides, vinylcyclohexene dioxide (1-epoxyethyl-3,4-epoxycyclohexane) is particularly suitable. A specially preferred mixture of epoxide resins comprises an epoxide of the peracetic type, such as vinylcyclohexene, and a diglycidal ether of a polyhydroxy compound, such as obtained by the condensation of epichlorohydrin and Bisphenol A. The relatively high cost vinylcyclohexene has a low viscosity about 20 centipoise, and fast curing rate; the well known Bisphenol A type epoxide being lower in cost, but having a viscosity in the range of 3,000–10,000 centipoise.

In any case, the selected resin-forming material, or mixture of selected materials, either in the monomer or prepolymer form, is dissolved in a suitable volatile liquid solvent. Not only must the solvent be miscible with the resin, but it must also be vaporizable at conditions of temperature and pressure occurring within the zone to be consolidated. The resin solution is typically injected under sufficient pressure to maintain the solvent liquified during the injection step, and then the pressure is reduced to accomplish vaporization of the solvent and deposition of the resin-forming material on the sand particles. Normally, sufficient heat is available within the formation to effect vaporization of the solvent without supplemental heating. However, it may be desirable to supply additional heat to accomplish vaporization, such as by passing a heated inert gas into the formation; thereby, additionally, permitting higher boiling solvents to be used.

Any non-reactive, low viscosity, high vapor pressure solvent with which the selected resin is miscible in the desired concentration range can be employed as the volatile solvent for dilution of the resin forming material. Suitable solvents include low boiling hydrocarbons, ketones, aldehydes and ethers individually selected for the particular application to achieve proper solubility and volatility. Alcohols may be similarly employed; however, care must be exercised to completely remove any residual solvent prior to injecting the gaseous curing agent, as the —OH groups react with the epoxide to form a less desirable resin.

Particularly preferred solvents for many applications are acetone, methyl ethyl ketone, methyl isobutyl ketone, benzene, toluene, xylene, methyl ethyl ether, diethyl ether, butane, heptane, hexane, and acetaldehyde. The solution can contain up to about 75 percent by weight resin-forming material; however, superior results are obtainable in many applications with more dilute solutions. Typically, solutions of 40 to 60 weight percent resin produce satisfactory results; this concentration range effecting a balance between the superior distribution obtainable at lower concentrations, and the reduced solvent costs and evaporation time encountered at higher resin concentrations. In particular applications, and with more viscous resins, it is often preferable to employ more dilute resin solutions.

Rapid pressure reduction is not desirable as high vaporization rates can cause excessive entrainment of the resin from the formation by the existing solvent vapors. At slow rates of vaporization, the exiting vapors perform a beneficial function in removing excess resin not deposited on the particle surfaces; thereby leaving as residue in the formation, only a thin surface coating of the resin-forming material.

The resin coating will polymerize, or cure, at most formation conditions without further treatment if adequate curing time is allowed. It is usually preferable to speed the return of the well to production by injecting a curing agent to accelerate hardening of the resin. Although many substances can be employed as curing agents, I have particularly found gaseous curing agents to be effective in this regard. Gaseous materials effective as resin curing agents, particularly for the preferred epoxy resins, are the various acid gases including halogen gases such as fluorine, chlorine, and bromine; hydrogen halides such as hydrogen fluoride, hydrogen chloride, hydrogen bromide and hydrogen iodide; gaseous boron-halides such as boron trichloride, boron trifluoride, boron monochloride pentahydride, and boron monobromide pentahydride; gaseous silicon halides such as silicon fluoride, trifluorosilicane, and chlorosilicane; dual halogens bromine chloride, chlorine monofluoride, and chlorine trifluoride; gaseous nitrogen-halogen compounds such as chloroazide, nitrosylchloride, nitrosylfluoride, nitrosylbromide, nitryl chloride, nitryl fluoride; and nitrogen oxides such as nitrogen dioxide and nitrogen tetraoxide. These materials are highly reactive as curing agents at ambient temperatures. If desired their activity can be moderated by admixing them with an inert gaseous diluent such as nitrogen.

Following the gaseous curing step, the well is returned to production in a conventional manner with no subsequent treatment generally required.

Most of the gaseous curing agents are so reactive that an impervious polymer layer is formed immediately on contact of the gas with the resin, thus preventing full penetration of the curing agent into the resin and resulting in decreased adhesiveness and decreased strength. The gaseous curing agent can be induced to penetrate the resin layer by admixing a small quantity of complexing agent with the resin solution prior to injection into the formation. Suitable complexing agents are those compounds, either soluble or dispersible in the particular resinous material, which form temporary or permanent complexes with the gaseous curing agent to render the curing agent unavailable to induce the resin polymerization for a certain time or up to a certain temperature. It is believed that such complexing agents function by preferentially associating with the curing agent, thus rendering the curing agent unavailable to catalyze the resin film. The curing agent penetrates the depth of the film in the complexed form, and on release achieves effective curing of the resin film throughout its entire depth. Not only must the complexing agent be nonevaporative so that it is not removed with the solvent, but it should also be noncatalytic, with reference to the resin polymerization, so that polymerization will not be initiated prior to injection of the curing agent.

Suitable complexing agents are those compounds, generally polar solvents, having electrons available for sharing with the gaseous curing agents. Preferred complexing agents are such compounds having 1 to 20 carbon atoms, and most preferably such compounds having 1 to 10 carbon atoms. Suitable complexing agents include alkylethers such as methyl ether, ethyl methyl ether, ethyl ether, ethyl propyl ether, n-propyl ether, butyl ether, n-octyl ether, etc.; heterocyclic ethers such as 1,4-dioxane, 1,3-dioxane, etc.; aryl ethers such as ethyl phenyl ether, butyl phenyl ether, ethyl octylphenyl ether, etc.; alkyl and aralkyl ketones such as methyl ethyl ketone, acetone, benzyl acetone, butyl phenyl ketone, amyl ethyl ketone, ethyl heptyl ketone, etc.; aliphatic alcohols such as methyl alcohol, ethylene glycol, 1-pentanol, 3-pentanol, 2-methyl-1-butanol, 3-methyl-1-butanol, etc.

Although the resin can be deposited without any preparation of the consolidation zone, improved results are obtained when the sand particles to be consolidated are free of oil and water. Oil can be effectively removed by injecting a wash liquid into the consolidation zone in an amount equal to or exceeding the pore volume of the consolidation zone. As the liquid is injected into the zone, portions of the connate oil and water are displaced into the formation. However, most formations cannot be rendered oil-free merely by displacement of the connate fluids, but require successive washing steps. Any wash liquid capable of removing oil from the sand particles may be employed, preferred wash liquids being those liquids miscible with the connate oil at formation conditions. Suitable solvents include petroleum distillate fractions, such as diesel oil, gas condensate, aromatic hydrocarbons, substituted aromatic hydrocarbons, ketones, alcohols, and detergent-water solutions. A preferred wash liquid is a petroleum distillate fraction high in aromatic content.

After a soaking period following injection of a first wash liquid, the first wash liquid is displaced into the formation with a subsequent treating fluid or a second wash liquid. Successive wash steps can be employed, using the same or different wash liquids, until eventually all of the connate oil is removed from the consolidation zone. One or more of these liquids can be heated to effect more efficient oil displacement, particularly in heavy oil formations and where relatively low formation temperatures are encountered.

Residual water is particularly detrimental in the case of epoxide resin, and can be removed from the interstitial spaces and sand surfaces within the consolidation zone by dehydration. Dehydration can be accomplished by passing a hot gas through the consolidation zone to vaporize the water, the gas carrying the water vapor from the consolidation zone into the formation. Preferably, dehydration is accomplished by injecting a hydrophilic solvent into the consolidation zone. Preferred solvents include alcohols, ketones, and like hydrophilic liquids. A particularly preferred dehydrating agent is anhydrous isopropyl alcohol. Dehydration and oil removal can be accomplished in a single preparation step using a single treating liquid where the selected liquid possesses both hydrophilic and solvent properties. A single combined wash and dehydration step is frequently preferred where gas sands are to be consolidated.

The following examples illustrate the consolidation of various types of incompetent oil-bearing sands by the technique of this invention.

*Example I*

A typical Los Angeles Basin oil sand is consolidated by the deposition of epoxy resin. A glass tube one inch in diameter and three inches long is packed with the sand to be consolidated. The air permeability of the packed, unconsolidated sand measures 5100 millidarcies. The sample is flushed with one pore volume of a wash liquid comprising a mixture of 50 volume percent acetone and 50 volume percent Freon T.F. The deoiled, dehydrated sand is next treated with a solution of peracetic-type epoxy resin-forming material containing complexing agents and having the following composition:

| | Vol. percent |
|---|---|
| Vinylcyclohexene dioxide | 50 |
| Anhydrous ethyl ether | 48 |
| Dioxan | 1 |
| Methyl alcohol | 1 |

The solvent was vaporized by passing a slowly flowing current of warm air at a temperature of between about 180° F. and about 200° F. through the packed tube for a period of about 30 minutes to vaporize the solvent and deposit the nonvolatile epoxy resin and complexing agent on the surface of the sand particles. The deposited resin is hardened by contacting the resin-coated sand with boron trifluoride gas. A small heat of reaction was noted.

The permeability of the consolidated sand is measured at 4,700 millidarcies. The consolidated sand is removed from the tube and observed to be agglomerated into a hard mass having the shape of the tube and an Instron compressive strength of 1,480 p.s.i.

*Example II*

Several packed tubes of Los Angeles Basin oil sand are consolidated according to the method of Example I using varying quantities of vinylcyclohexene dioxide to determine the effect of resin quantity on permeability and compressive strength. In each case, one pore volume of resin solution is added to the sand pack. However, these solutions contain 50, 40, 30 and 20 volume percent of vinylcyclohexene dioxide, respectively; the deleted resin being replaced by additional solvent in each case.

Results obtained by the foregoing tests are as follows:

| Solution Resin Content, vol. percent | Air Permeability, millidarcies | Compressive Strength, p.s.i. |
|---|---|---|
| 50 | 4,739 | 4,500 |
| 40 | 4,330 | 1,320 |
| 30 | 4,464 | 630 |

The sand treated with one volume percent of 20 percent resin solution was not sufficiently consolidated to remain intact when removed from the glass tube.

Many modifications and variations of the invention as hereinbefore described may be made without departing from the original spirit and scope thereof, and these modifications and variations are included within my invention as defined by the following claims:

I claim:

1. A method of consolidating lose, unconsolidated sand particles in an earth formation penetrated by a well bore comprising:
   injecting a solution of resin-forming material dissolved in a volatile liquid solvent through said well bore and into said formation under conditions of temperature and pressure which prevent substantial vaporization of said solvent;
   vaporizing said solvent and thereby causing said resin-forming material to be deposited as a coating on the surface of said sand particles; and
   curing said deposited resin-forming material by passing a gaseous curing agent through said well bore and into contact with said deposited resin-forming material in said formation.

2. The method defined in claim 1 wherein said resin-forming material comprises epoxy resin.

3. The method defined in claim 1 wherein said resin-forming material comprises vinylcyclohexene dioxide.

4. The method defined in claim 1 wherein said volatile solvent in anhydrous ether.

5. The method defined in claim 1 wherein vaporization of said solvent is effected by reducing the pressure within said formation to a value below the vapor pressure of said solvent at the formation temperature.

6. The method defined in claim 1 wherein vaporization of said solvent is effected by passing a heated inert gas through said well bore and into contact with said solution of resin-forming material in said formation.

7. The method defined in claim 1 wherein said gaseous curing agent is selected from the group consisting of gaseous halogens, halides and nitrogen oxides.

8. The method of claim 1 wherein said gaseous curing agent is a hydrogen halide.

9. The method of claim 1 wherein said gaseous curing agent is hydrogen bromide.

10. The method of claim 1 wherein said gaseous curing agent is injected into said well bore in admixture with an inert gaseous diluent.

11. The method of claim 1 wherein said solution of resin-forming epoxide contains between about 0.1 and about 5 weight percent of a complexing agent which donates a pair of electrons to form a compound having a coordinate covalent bond with said gaseous curing agent.

12. The method of claim 11 wherein said complexing agent is dioxan.

13. A method of consolidating loose or unconsolidated sand particles in an earth formation penetrated by a well bore comprising:
   displacing oil from the zone of said formation to be consolidated by injecting through said well bore and into said zone at least one pore volume of wash liquid;
   injecting a solution of epoxy resin dissolved in a volatile liquid solvent through said well bore and into said formation under conditions of temperature and pressure which prevent substantial vaporization of said solvent;
   vaporizing said solvent and thereby causing said epoxy resin to be deposited as a coating on the surface of said sand particles; and
   curing said deposited epoxy resin by passing a gaseous curing agent, selected from the group consisting of gaseous halogens, halides and nitrogen oxides, through said well bore and into contact with said epoxy resin deposited in said formation.

14. The method defined in claim 13 including the step of dehydrating said zone having said oil displaced therefrom.

15. The method defined in claim 13 wherein said wash liquid is a hydrophilic liquid capable of dehydrating said zone.

16. A method of consolidating loose or unconsolidated sand particles in an earth formation penetrated by a well bore comprising:
   displacing oil from the zone of said formation to be consolidated by injecting through said well bore and into said zone at least one pore volume of a petroleum distillate fraction;
   dehydrating said zone to remove residual water therefrom;
   injecting a solution of epoxy resin dissolved in a volatile liquid solvent through said well bore and into said formation under conditions of temperature and pressure which prevent substantial vaporization of said solvent, said solution containing between about 0.1 and about 5 weight percent of a complexing agent which donates a pair of electrons to form a compound having a cordinate covalent bond with said gaseous curing agent; and
   curing said deposited epoxy resin by passing a gaseous curing agent, selected from the group consisting of gaseous halogens, boron trifluoride, boron trichloride, boron monochloride pentahydride, boron monobromide pentahydride, gaseous hydrogen halides, gaseous silicon halides, gaseous dual halogens, gaseous nitrogen-halogen compounds and nitrogen oxides, through said well bore and into contact with said epoxy resin deposited in said formation.

17. The method defined in claim 16 wherein said zone to be consolidated is dehydrated by injecting a hydrophilic liquid through said well bore and into said zone.

18. The method defined in claim 16 wherein said zone to be consolidated is dehydrated by passing a hot inert gas through said well bore and into said zone.

19. The method defined in claim 16 wherein said epoxy resin solution comprises between about 5 and about 75 volume percent vinylcyclohexene dioxide, between about 0.1 and about 5 volume percent dioxan and between about 0.1 and about 5 volume percent methanol in ethyl ether.

References Cited

UNITED STATES PATENTS

| | | | |
|---|---|---|---|
| 3,100,527 | 8/1963 | Hilton et al. | 166—33 |
| 3,176,767 | 4/1965 | Brandt et al. | 166—33 |
| 3,176,769 | 4/1965 | Treadway et al. | 166—33 |
| 3,223,161 | 12/1965 | Burge | 166—33 |
| 3,250,330 | 5/1966 | Smith | 166—33 |
| 3,291,213 | 12/1966 | Bezemer et al. | 166—33 |

CHARLES E. O'CONNELL, *Primary Examiner.*

STEPHEN J. NOVOSAD, *Examiner.*